United States Patent Office 3,325,552
Patented June 13, 1967

3,325,552
DEHYDROGENATION-CYCLIZATION
Arnold N. Wennerberg, Chicago, Ill., assignor to Standard Oil Company, Chicago, Ill., a corporation of Illinois
No Drawing. Filed Aug. 16, 1963, Ser. No. 302,744
7 Claims. (Cl. 260—673.5)

This invention relates to a hydrocarbon catalytic conversion process and more particularly pertains to the catalytic dehydrogenation-cyclization of certain mono-olefin hydrocarbons.

The preparation of p-xylene by catalytic conversion of diisobutylene with $Cr_2O_3$—$Al_2O_3$ catalyst is known. Also known is the preparation of aromatic hydrocarbons through the reaction of iodine with certain olefins.

A new process for the preparation of aromatic hydrocarbons from certain mono-olefin hydrocarbon feeds has been discovered. This process involves contacting in a catalytic conversion zone at a temperature over 400° C. a hydrocarbon having a mono-olefin open chain of four to six carbon atoms in length and a total of six to twenty carbon atoms with a catalyst having three different metal oxides of which one is alumina and the other two are one each of alkaline earth metal oxide and oxide of a low melting metal having an atomic weight of from about 65 to 113. Desirably the catalyst has the component weight ratio of from 0.1 to 5 parts of each of said alkaline earth metal oxide and said low melting metal oxide for each 10 weight parts of alumina. The preferred weight ratio of the component oxides is in the range of from 0.5 to 4 parts of each of said alkaline earth metal oxide and low melting metal oxide for each 10 parts of alumina. Since the alumina is part of the catalyst composition, the terms "alumina" and/or $Al_2O_3$ are used to indicate activated aluminas rather than catalyticaly inactive alpha alumina. Desirable alkaline earth metal oxides for the catalyst are calcium, magnesium and barium oxides with magnesium oxide (magnesia) the preferred alkaline earth metal oxide. Oxides of zinc and cadmium are the oxides of said low melting metals and zinc oxide is preferred. The combinations of zinc oxide-magnesia-alumina give higher conversions and selectivities than when magnesia is replaced with CaO or BaO. Likewise, when CdO replaces ZnO there is experienced a loss of selectivity and conversion over the preferred combination of the three different metal oxides. Catalyst containing the preferred metal oxides wherein the weight ratio of zinc oxide to magnesia is 1:1 are most preferred.

The process of this invention is a flow-type process whereby the feed hydrocarbon is introduced at or about dehydrogenation-cyclization temperature of above 400° C. into a catalytic conversion zone having as the catalyst the solid combination of the three different metal oxides in a solid form of a particle size which depends upon the manner in which the catalyst is being used. The catalytic conversion zone can employ the catalyst as a fixed bed, a moving catalyst bed or a fluidized bed of catalyst. The fixed bed catalyst can utilize the rather coarse solid particles, the moving catalyst utilizes less coarse particles of catalyst, and the fluidized catalyst uses the least coarse catalyst particles. The particle sizes suitable for each type of catalyst bed are well known to those skilled in the art.

The flow process can be conducted under a positive pressure, i.e., above atmospheric pressure, at atmospheric pressure, or at a reduced subatmospheric pressure. Since the catalyst in the catalytic conversion zone exerts a resistance to the flow of hydrocarbon feed therethrough, causing a pressure drop between the inlet pressure to and the discharge pressure from the catalytic conversion zone and the catalyst path length can vary according to the design of the conversion zone chamber, the foregoing pressures refer to the discharge which can be the same for any catalyst bed path length. The dehydrogenation reaction approaches only the production of a reaction mixture whose composition is representative of the thermodynamic equilibrium of feed and products. Thus absolute pressures above one atmosphere favor a reversal of the reaction depressing dehydrogenation of the feed, but the cyclization reaction tends to offset the effect of increased pressure. Discharge pressures up to about two atmospheres can be suitably used but positive pressure operation with discharge pressures in the range of one to two atmospheres are desirably used and discharge pressures in the range of 1.0 to 1.25 atmospheres, inclusive, are preferred. Subatmospheric discharge pressures can be used to advantage.

In the process of this invention the catalyst employed can tolerate high feed hydrocarbon rates. Since it is convenient to meter the flow of the hydrocarbon as a liquid into the process for flow control, the flow rates of feed hydrocarbon are expressed in liquid hourly space velocity (LHSV) rates with the units liquid volume of hydrocarbon per volume of catalyst per hour. Suitable LHSV rates are in the range of 1 to 20 or higher. High LHSV rates tend to result in somewhat higher by-product formation. Also, since dehydrogenation reactions are endothermic, high LHSV rates require higher input. Generally, high LHSV rates also provide more favorable conversions of feed to product. The selection of LHSV rate of feed hydrocarbon becomes a matter of choice determined by economic balance of conversion and heat input, selection of the type of catalyst bed and design of the catalyst chamber. For fixed bed operation feed hydrocarbon LHSV rates of 1 to about 10 are suitable, 3 to 8 are highly desirable, and 4 to about 7 are preferred.

One convenient method of supplying heat for the endothermic dehydrogenation is to dilute the feed hydrocarbon with a gas or vaporizable heat carrier diluent. Such diluents should be inert to the feed hydrocarbon and the hydrocarbon product and should not be adversely reactive with the catalyst, that is, the diluent should not be a catalyst poison. Nitrogen, argon, carbon dioxide are illustrative but not limiting examples of inert gases. Normally gaseous or normally liquid (gas or liquid at 25° C. and atmospheric pressure, respectively) hydrocarbon in reaction with the feed hydrocarbon or hydrocarbon product can be used as diluents. Of such hydrocarbons those which are thermally stable at temperatures above 400° C. and especially in contact with activated alumina are desirable, useful diluents and those having high heating capacity are preferred. For the process of this invention aromatic hydrocarbons and especially benzene are preferred as the hydrocarbon diluent. The catalyst used in the process of this invention does not cause the dehydrogenation of alkane hydrocarbons. When feed hydrocarbons useful in the process of this invention are available in admixture with alkane hydrocarbons, no additional diluent need be added.

In the positive pressure technique of conducting the process of this invention it is desired that the feed hydrocarbon be diluted to a concentration providing the feed hydrocarbon at a partial pressure thereof of from 0.1 to 10 pounds per square inch absolute (p.s.i.a.). Preferably this mode of conducting the process of this invention employs the feed hydrocarbon at a partial pressure in the range of 0.7 to 8 p.s.i.a. However, for subatmospheric pressure less dilution of the feed hydrocarbon is required and as the pressure (discharge pressure from the catalytic conversion zone) is decreased, the amount of diluent also can be decreased. In general, desirable reduced pressures measured at the discharge end of the catalytic conversion zone are in the range of 50 to 500 mm. Hg and are preferably in the range of 100 to 350 mm. Hg. At reduced pressures below about 350 mm. Hg, little or no diluent need be added to the feed hydrocarbon provided that adequate heat can be added to the feed, to the feed and catalyst or to the catalyst alone.

Though a fixed bed reactor provides the simplest form for the catalytic conversion zone, provision must be made for cyclic operations involving two primary sequences: hydrocarbon conversion and catalyst regeneration. The activity of the catalyst used in the process of this invention declines with deposits of carbonaceous materials thereon. These carbonaceous materials may be formed either by side reactions producing relatively non-volatile polymeric substances or by entrapment on the catalyst or hydrocarbons either or both of which deposits are carbonized to form a coke-like deposit. The carbonaceous deposit can be readily removed from the catalyst by controlled burning of the carbonaceous deposit as, for example, by limiting the oxygen during the regeneration cycle to prevent destruction and/or removal of catalyst components by undesirably high oxidation temperatures. Regeneration temperature or oxidation temperature control can be achieved through the use of gases diluted with respect to oxygen, for example, gaseous mixtures containing from about 2 to about 10% oxygen by volume. Such dilute concentrations of oxygen can be obtained by diluting air or commercial oxygen, for example with carbon dioxide. Catalyst regeneration can be accomplished in a commercially feasible regeneration cycle time in the range of from 500 to 600° C.

The hot regenerated catalyst, especially in a system using a moving bed or fluidized bed of catalyst, can be used to supply the necessary heat for the endothermic dehydrogenation and cyclization. In such systems the feed need not be heated to as high a temperature as, for example, for a fixed bed system and these systems may be operated under conditions substantially approaching adiabatic conditions. Dehydrogenation systems employing fixed bed catalyst can also be operated under adiabatic conditions by using the heat retained by the regenerated catalyst bed, but in general, such operations will result in a shorter on stream catalyst utilization because now the catalyst bed becomes limited in use when the temperature of the catalyst bed drops below the dehydrogenation temperature rather than being limited by deactivation by carbonaceous deposits. Thus, it is more advantageous to use the system employing the fixed catalyst bed wherein substantially isothermal conditions are employed by maintaining the catalyst bed at or near the desired dehydrogenation temperature and by adding at least a part of the heat required by the endothermic reaction to the hydrocarbon feed.

To provide substantially continuous operation with a fixed bed catalyst system, two or more catalytic conversion zones are employed, for example, when two catalytic conversion zones are employed, the first is placed on stream for hydrocarbon conversion until the desired minimum activity level of the catalyst is reached and then the second catalytic conversion zone is substituted for the first and the first catalytic conversion zone is subjected to regeneration. When a process is devised with a relatively small decrease in hydrocarbon conversion, more than two catalytic conversion zones may be necessary so that adequate regeneration of the catalytic conversion zone can be accomplished before the use thereof back on stream is required. The provision of the necessary switch valving and conduits for use in such a plurality of catalytic conversion zones to always provide at least one on stream while another or others are being regenerated and also providing a regenerating catalytic conversion zone on standby is well understood by those skilled in the art of designing and operating catalytic hydrocarbon conversion processes. In its simplest form the fixed bed system employs a vertical reactor comprising the catalytic conversion zone and either separately or an integral part thereof provisions for preheating the feed as well as adding feed to the catalyst. It is advantageous to employ as an integral part of a vertical reactor vessel a preheat zone packed with refractory solid material to which heat can be supplied to the feed passing therethrough. The selection of a bed heat exchange refractory solid is not critical to the process of this invention and is well within the skill of those having experience in catalytic hydrocarbon conversion processes. The fixed bed system can be operated by either upflow or downflow of the feed.

The process of this invention is especially useful in the preparation of p-xylene from isobutylene. The isobutene is dimerized by any suitable means and diisobutylene is then used as the feed in the process of this invention. In a co-pending application there is described a useful method for converting butenes to butadiene. This method converts both butene-1 and butene-2 to butadiene through the use of the same catalyst system employed in the process of this invention. Thus, an integrated system employing as the feedstock a $C_4$ hydrocarbon stream obtained from catalytic cracking operations can be employed to produce both butadiene and para-xylene. For example, the $C_4$ fraction containing butanes, butene-1, butene-2 and isobutene used as the feed for the aforementioned integrated process is first subjected to acid extraction, for example, with sulfuric acid to remove butene-1 and butene-2 from the $C_4$ hydrocarbon feed. The mixture of butane and isobutene from the acid extraction is then subjected to a dimerization step and the mixture of butane and diisobutylene is employed in the process of this invention to produce p-xylene. The normal butanes (butene-1 and butene-2) are removed from the sulfuric acid, for example, by a heavier hydrocarbon such as butane or benzene and the mixture of normal butenes with the heavier hydrocarbon is contacted with the catalyst having three different metal oxides, for example, zinc oxide-magnesium, oxide-alumina as hereinbefore defined at a temperature above 400° C. By such an integrated process a conversion of the normal butenes to butadiene in conversions of from 20 to 25% at selectivities of about 90% can be achieved and conversion of diisobutylene to para-xylene of about 50% with selectivities of above 90% can be obtained.

By the process of this invention normal hexene-1 and normal hexene-2 can be dehydrogenated and cyclized to benzene. The dehydrogenation and cyclization which occur in the process of this invention are not limited to two open chain mono-olefinic hydrocarbons but rather occur when nuclear substituted monoalkenyl groups are on aromatic hydrocarbon rings. For example, by the process of this invention 4-phenylbutene-1 or 4-phenylbutene-2 is the feed hydrocarbon to the process of this invention. Dehydrogenation of the side chain probably to a conjugated system occurs followed by cyclization to form naphthalene. Substituted naphthalenes can be obtained by subjecting 4-phenyl-2-methylbutene-1, 4-phenyl-3-methylbutene-1 as well as corresponding butene-2 compounds to the process of this invention. When ethyl substituted hexenes are subjected to the process of this invention the hexene chain is dehydrogenated probably to a triene and then cyclized to form a benzene ring with an ethyl substituent and the ethylbenzene according to still another co-pending application is dehydrogenated to styrene. To produce a substantial amount of styrene a particular isomer of ethylhexene thereof would be required as a feed for the process of this invention. However, with respect to the use of an ethylhexene in the process of this invention there may be obtained a mixture of hydrocarbon products containing styrene.

The process of this invention can be more clearly understood from the following illustrative examples.

Example I

Using a downflow reactor with a fixed catalyst bed having a length to diameter ratio of 10 and a feed preheat section containing particles of a refractory solid such as tabular alumina with the catalyst comprising the oxides of zinc, magnesium and aluminum in the weight ratio of 3.3 $ZnO$–3.3 $MgO$–10 $Al_2O_3$, the catalytic conversion zone at about 600° C., diisobutylene is charged at a liquid volume thereof per volume of catalyst per hour of 5 to 1. The catalytic conversion zone is operated at a positive pressure of about 19.7 p.s.i.a. discharge pressure and the diisobutylene is diluted with nitrogen to provide a diisobutylene partial pressure in the range of 0.1 to 0.2 atmospheres. The resulting product is analyzed after 1 hour on stream and after 2 hours on stream. The product distribution for these two time periods is as follows:

| Product Distribution | Hours on Stream | |
|---|---|---|
| | 1 hour, Percent | 2 hours, Percent |
| 2,5-diisobutylene | 19 | 23 |
| 2,5-dimethylhexene | 14 | 18 |
| p-Xylene | 51 | 45 |
| m-Xylene | 3.0 | 1.9 |
| o-Xylene | 2.0 | 1.3 |
| Isobutylene | 11.0 | 10.8 |

Based on conversion of diisobutylene to xylenes, the following product distribution per pass is obtained:

| After 1 hour on stream | After 2 hours on stream |
|---|---|
| p-Xylene, 51%. | p-Xylene, 45%. |
| m-Xylene, 3.0%. | m-Xylene, 1.9%. |
| o-Xylene, 2.0%. | o-Xylene, 1.3%. |
| Selectivity, 91.0%. | Selectivity, 93.4%. |

It will be appreciated by those skilled in the art that the products of the foregoing reaction which are not xylenes, that is, 2,5-dimethylhexene, unconverted diisobutylene and isobutylene may be recycled to the dimerization step and then to the process of this invention to be further converted to xylenes.

In the foregoing integrated process which starts with a $C_4$ hydrocarbon fraction containing butane, n-butene-1, n-butene-2, and isobutene, the conversion of a mixture of butane and isobutene by the process of this invention to xylenes can be expected to produce results substantially equivalent to those hereinbefore indicated after the isobutylene is dimerized in the presence of butane and then charged to the dehydrogenation and cyclization process of this invention. After the normal butenes are recovered from the acid extraction step, for example, with benzene, the mixture of benzene and n-butene-1 and n-butene-2 can be subjected to the same catalyst system, of course in a separate reactor, using the same catalyst and under the same conditions of temperature, butene partial pressure, liquid hour space velocity as set forth in the foregoing example for converting diisobutylene to xylenes.

Example II

Benzene can be prepared, for example, by contacting the catalyst of Example I at a temperature within the range of about 525 to 590° C. with a mixture of benzene and mono n-hexenes (a single mono n-hexene isomers or mixtures of mono n-hexene isomers) at feed rate LHSV ratios of from 2 to 10 liquid volumes of n-hexene feed per volume of catalyst and at benzene dilutions to provide the n-hexene feed with concentrations corresponding to a partial pressure of from 0.1 to 0.5 atmospheres at a catalytic conversion zone discharge pressure in the range of from 1 to about 2 atmospheres absolute pressure.

By such a process conversions of the n-hexene feed to benzene on a product basis approaching the thermodynamic heat equilibrium and at selectivities above 90% are obtainable.

Other hydrocarbons containing the mono-olefin open chain of six chain carbon atoms either as an open chain hydrocarbon or as a substituted aromatic compound can be used in the process of this invention in place of the specific compounds hereinbefore named since with the foregoing disclosure those skilled in the art can readily visualize the types of hydrocarbons useful in the process of this invention and the products to be obtained therefrom.

What is claimed is:

1. A method of preparing aromatic hydrocarbons comprising contacting at a temperature above 400° C. in a catalytic conversion zone a hydrocarbon having a mono-olefin open chain of only from 4 to 6 chain carbon atoms in length and a total of 6 to 20 carbon atoms with a catalyst having the three different metal oxides; zinc oxide, magnesia and alumina whereat said mono-olefin hydrocarbon chain undergoes dehydrogenation and cyclization.

2. The method of claim 1 wherein the three metal oxides are present in the weight ratios in the range of from 0.1 to 5 parts of each of zinc oxide and magnesia for each 10 parts alumina.

3. A method of preparing benzene comprising contacting a n-hexene at a temperature above 400° C. in a catalytic conversion zone with a catalyst having the three different metal oxides in the weight ratio indicated by the range of from 0.1 to 5 parts each of zinc oxide and magnesia for each 10 parts of alumina whereat said hexene is dehydrogenated and cyclized to benzene.

4. A method of preparing xylenes comprising contacting diisobutylene at a temperature above 400° C. in a catalytic conversion zone with a catalyst having the three different metal oxides in the weight ratio indicated by the range of from 0.1 to 5 parts each of zinc oxide and magnesia for each 10 parts of alumina whereat said diisobutylene is dehydrogenated and cyclized to xylenes.

5. The method of claim 4 wherein the effluent from said catalytic conversion zone is separated to recover the xylene product and the remaining hydrocarbons of said effluent are recycled to the catalytic conversion zone.

6. A method of preparing xylenes comprising dimerizing isobutene in admixture with butanes to a mixture of diisobutylene in butanes, contacting the butane-diisobutylene at a temperature above 400° C. in a catalytic conversion zone with a catalyst having the three different metal oxides in the weight ratio indicated by the range of from 0.1 to 5 parts each of zinc oxide and magnesia for each 10 parts of alumina, separating xylene product from the effluent from said catalytic conversion zone and recycling the hydrocarbons remaining from said effluent to the dimerization step.

7. A method of preparing a xylene product and butadiene comprising separating a $C_4$ hydrocarbon mixture into a butane-isobutene fraction and a n-butene fraction, subjecting the butane-isobutene fraction to dimerization whereat a butane-diisobutylene product is obtained, contacting the butane-diisobutylene product at a temperature above 400° C. in a catalytic conversion zone with the catalyst having the components in the weight ratio indicated by the range of from 0.1 to 5 parts by weight each of zinc oxide and magnesia for each 10 parts by weight of alumina, separating the catalytic conversion zone effluent into a xylene product and a hydrocarbon mixture composition comprising essentially the remainder of said catalytic conversion zone effluent and recycling to dimerization said hydrocarbon remainder; contacting said n-butene fraction at a temperature above 400° C. in a second catalytic conversion zone with the catalyst having the components in the weight ratio indicated by the range of from 0.1 to 5 parts by weight each of zinc oxide and magnesia for each 10 parts by weight of alumina, separating butadiene product from the effluent from said second catalytic conversion zone and recycling the remainder of the hydrocarbons from the effluent of said second catalytic conversion zone to said second catalytic conversion zone.

References Cited

UNITED STATES PATENTS

| | | | |
|---|---|---|---|
| 2,632,739 | 3/1953 | Dinwiddie et al. | 260—673.5 |
| 2,689,265 | 9/1954 | Dinwiddie et al. | 260—673.5 |
| 2,692,846 | 10/1954 | Oblad et al. | 260—673.5 |
| 2,754,345 | 7/1956 | Kirshenbaum | 260—673.5 |
| 2,785,209 | 3/1957 | Schmetterling et al. | 260—673.5 |
| 2,798,890 | 7/1957 | Waterman et al. | 260—673.5 |

DELBERT E. GANTZ, *Primary Examiner.*

ALPHONSO D. SULLIVAN, *Examiner.*